United States Patent [19]

Ishida et al.

[11] 4,305,494
[45] Dec. 15, 1981

[54] CLUTCH DISC ASSEMBLY

[75] Inventors: Nobuyasu Ishida, Tokai; Hisami Tsujio, Okazaki, both of Japan

[73] Assignee: Aisin Seiki Kabushiki Kaisha, Kariya, Japan

[21] Appl. No.: 47,639

[22] Filed: Jun. 11, 1979

[30] Foreign Application Priority Data

Jun. 14, 1978 [JP] Japan .................................. 53/71896

[51] Int. Cl.$^3$ .............................................. F16D 69/02
[52] U.S. Cl. ........................... 192/107 M; 188/251 A
[58] Field of Search ................. 192/52, 70.14, 107 C, 192/107 M; 188/251 R, 251 A, 251 M

[56] References Cited

U.S. PATENT DOCUMENTS

| | | | |
|---|---|---|---|
| 2,135,126 | 11/1938 | Harwood | 192/107 |
| 3,221,853 | 12/1965 | Batchelor et al. | 192/107 M |
| 4,202,432 | 5/1980 | Komori | 192/107 M |

Primary Examiner—Louis Rimrodt
Attorney, Agent, or Firm—Oblon, Fisher, Spivak, McClelland & Maier

[57] ABSTRACT

A clutch disc assembly including a pair of annular friction facings in the form of a truncated-conical shape adapted to be frictionally gripped and flattened between a flywheel and a pressure plate in the engage state, the friction facings being made of a composite material consisting essentially of asbestos fiber and thermoset resin and being arranged to be contiguous to the side-face of the flywheel at their inner peripheries and spaced apart from the flywheel at their outer peripheries in the disengaged state, the hardness of the inner periphery of the facing opposed to the flywheel being greater than that of its remaining portion, and the hardness of the outer periphery of the facing opposed to the pressure plate being greater than that of its remaining portion.

1 Claim, 3 Drawing Figures

CLUTCH DISC ASSEMBLY

BACKGROUND OF THE INVENTION

The present invention relates to friction disc clutch assemblies, and more particularly to an improvement of a clutch disc assembly to render quick declutching operation of the clutch assembly.

Usually, friction clutches of the disc type include a clutch disc assembly which is axially slidable on a driven shaft. The clutch disc assembly is interposed between a flywheel and a pressure plate and fitted with friction facings adapted for engagement with both the flywheel and the pressure plate to transmit the rotation torque of the drive shaft to the driven shaft. In the declutching operation, such a negative means as vibration of the engine is adapted to disengage the clutch disc from the flywheel. However, if there is insufficient sliding action of the clutch disc along the drive shaft, the clutch disc cannot disengage quickly from the flywheel, and this causes undesired friction within the clutch assembly.

As shown in FIG. 1, to avoid the above drawbacks, a clutch disc assembly 10 has been recently proposed which is provided with a pair of annular friction facings 11 and 12 in the form of a truncated-conical shape.

In the disengaged state, each of the friction facings 11, 12 is contiguous to the side-face fo flywheel 20 at its inner periphery and is spaced from the flywheel 20 at its outer periphery. In the engaged stage, the friction facings 11, 12 are gripped and flattened between the flywheel 20 and the pressure plate 30 to store self-return or reaction forces therein. Upon declutching, the reaction forces return the friction facings 11, 12 to their original shapes as shown in FIG. 1 to cause quick disengagement of the friction clutch. In the practical use of such friction facings 11, 12, the declutching operation will be disturbed by slight contact of the facing 11 with the side-face of flywheel 20, and the outer periphery of facing 12 will be distorted by heat of friction.

To avoid the above-noted disadvantages, it is desirable that annular members 11a, 12a of low frictional coefficient material are firmly attached to the inner periphery of facing 11 and the outer periphery of facing 12. This serves to decrease drag torque transmitted to the clutch disc assembly, but the attached annular members are apt to be detached from the respective facings due to heavy torque from flywheel 20 and heat of friction.

SUMMARY OF THE INVENTION

It is, therefore, an object of the present invention to provide a clutch disc assembly capable of decreasing the drag torque without the disadvantages as above referred to.

According to the present invention there is provided a clutch disc assembly which includes a pair of annular friction facings in the form of a truncated-conical shape adapted to be frictionally gripped and flattened between a flywheel and a pressure plate in the engaged state, the friction facings being made of a composite material consisting essentially of asbestos fiber and thermoset resin and being arranged to be contiguous to the side-face of the flywheel at their inner peripheries and spaced apart from the flywheel at their outer peripheries in the disengaged state, the hardness of the inner periphery of the facing opposed to the flywheel being greater than that of its remaining portion, and the hardness of the outer periphery of the facing opposed to the pressure plate being greater than that of its remaining portion.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 2:
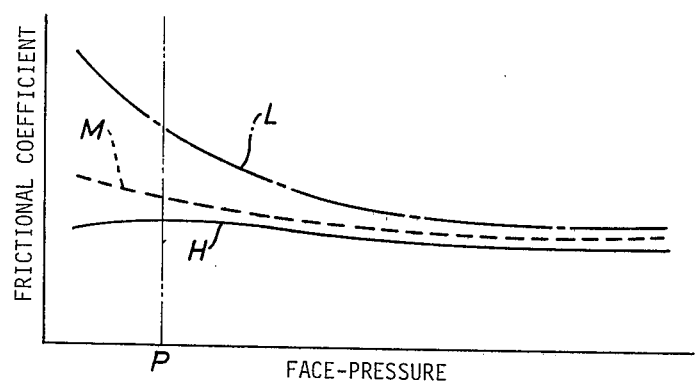
FIG. 2 is a graphic chart showing changes of a frictional coefficient in relation to changes of face-pressure.
Figure 3:
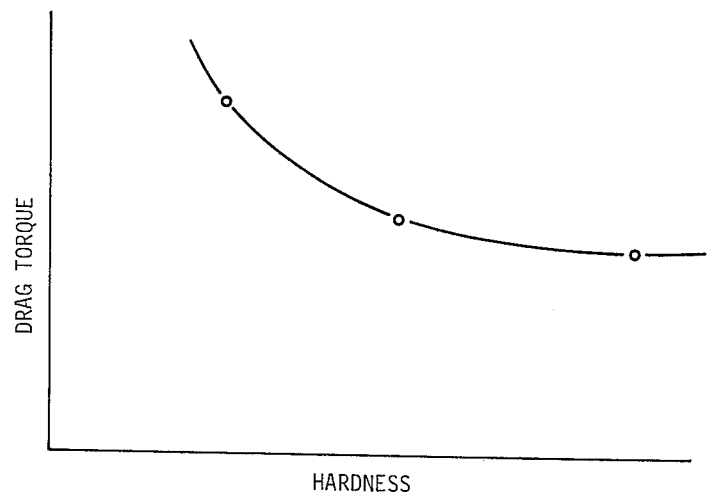
FIG. 3 is a graphic chart showning changes of drag torque in relation to hardness of a friction facing.

Referring now to the drawings, FIG. 2 shows changes of a frictional coefficient in relation to changes of face-pressure taking into consideration the respective hardness of three different friction facings. In this figure, a dot-dash line L indicates the characteristic of a friction facing of low hardness, a solid line H indicates the characteristic of a friction facing of high hardness, and a dotted line M indicates the characteristic of a friction facing of medium hardness. From the characteristic lines L, M and H, it will be understood that the respective frictional coefficients of the facings become greatly different in accordance with decrease of face-pressure, and similar in accordance with increase of face-pressure. Assuming that the face-pressure is at a predetermined low value P shown in FIG. 2, changes of drag torque in relation to each hardness of the facings are plotted as shown in FIG. 3.

From the above-noted facts, it will be understood that the drag torque under low face-pressure is greatly influenced by the hardness of the facing and decreases in accordance with increase of hardness of the facing. On the other hand, it is noted that when a friction facing of a clutch disc assembly may not be disengaged from a flywheel due to insufficient sliding action of the clutch disc, the face-pressure of the facing against the flywheel remains at a low value.

Figure 1:
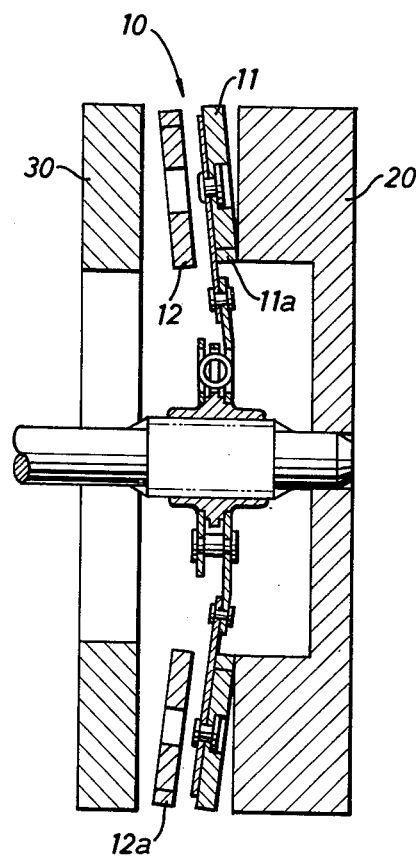
FIG. 1 is a clutch disc assembly.

From the point of view of what has been mentioned above, the present invention is intended to provide a friction facing whose inner periphery is hardened more than its remaining portion or whose inner and outer peripheries are hardened more than its remaining portion. In the practical use of the friction facing of the present invention, the frictional coefficient of the hardened portion becomes smaller than that of the remaining portion in the declutching operation. A friction facing hardened only at its inner periphery will be suitable for friction facing 11 shown in FIG. 1. A friction facing hardened at its inner and outer peripheries will be suitable for either one of the friction facings 11 and 12 shown in FIG. 1. This means that even if the friction facing is erroneously attached to the clutch disc assembly, it will serve to ensure the intended function. In addition, as the friction facings of the present invention are made of a composite material consisting essentially of asbestos fiber and thermoset resin and are formed in a piece by pressing, unexpected separation of the hardened portion from the facing is reliably prevented. This serves to ensure the intended function over a long period of time, relative to a conventional friction facing.

In the fabrication of the friction facing, thermoset resin adheres to surfaces of innumerable asbestos fibers and permeates into innumerable spaces among the fibers. This results in the hardening of the asbestos fibers due to the self-hardness of thermoset resin. In other words, the grade of hardening is substantially defined by the amount of thermoset resin in a unit of volume of the facing. Thus, in practice, an intended friction facing is obtained by using a greater amount of thermoset resin at its inner periphery or at its inner and outer peripheries than at its remaining portion in a unit of volume. In the process for fabricating a friction facing of the present invention, a thread of asbestos fibers and wires or a sheet of asbestos fibers with flat web are used as one of main factors of the material, and a 10-30% solution of thermoset resin such as phenol resin or melamine resin is used as the other main factor of the material.

When the asbestos thread is used, the thread is dipped into the solution of thermoset resin and thereafter dried at 80°-110° C. for several minutes. The dried thread is wound in an annular shape with a load of 30-100 kg and pressed in a metallic mold with pressure of 50-200 kg/cm² at 150°-180° C. during 1-2 minutes. The pressed thread is completely hardened in the mold with 5-10 kg/cm² pressure at 180°-220° C. and finished by grinding as a friction facing. If a heavy load is given to the thread at the initial stage during the winding process, the density of the inner periphery of the wound thread becomes high as a result of the increased density of thermoset resin adhering to the thread. This condition will be retained until the end of the fabricating processes. As a result of the winding process, the finished friction facing is more hardened at its inner periphery than in its remaining portion.

If higher pressure is given to the inner and/or outer peripheries of the wound thread during the pressing process, the density of the inner and/or other peripheries of the pressed thread becomes higher, and this condition will be retained until the end of the fabricating processes. As a result of grinding the hardened thread in a uniform thickness, the finished friction facing is more hardened at its inner and/or outer peripheries than in its remaining portion. If the wound thread is preliminarily soaked at its inner and outer peripheries with a greater amount of thermoset resin than in its remaining portion, the finished friction facing is more hardened at its inner and outer peripheries than in its remaining portion.

When the above-described asbestos sheet is used to fabricate a friction facing, the asbestos sheet is dipped into the solution of thermoset resin and thereafter dried and cut in an annular shape. Alternatively, the asbestos sheet may be cut in an annular shape and thereafter dipped into the solution of thermoset resin and dried. The dried sheet in the form of an annular disc shape is pressed and hardened in a metallic mold, as previously described, and then finished by grinding as a friction facing. If the dried sheet is provided at its inner periphery with a greater amount of asbestos fibers than in its remaining portion, or the same is soaked at its inner periphery with a greater amount of thermoset resin than in its remaining portion, the finished friction facing is more hardened at its inner periphery than in its remaining portion.

A friction facing of the present invention is preferably fabricated as described hereinafter.

EXAMPLE 1

An asbestos thread is prepared by twisting three years of asbestos and a single wire. The asbestos thread is dipped into a 25% solution by weight of phenol resin for five or six minutes and thereafter dried at 80° C. for two or three minutes. The dried asbestos thread is wound with a load of 100 kg at the initial stage and subsequently wound with a load of 50 kg to form an annular disc plate. The wound disc plate is entered into a metallic mold and pressed under pressure of 100 kg/cm² at 160° C. for two minutes. The pressed disc plate is hardened in the mold under pressure of 8 kg/cm² at 200° C. The hardened disc plate is ground at its opposite faces to provide a friction facing with a uniform thickness.

EXAMPLE 2

The asbestos thread is dipped into the solution of phenol resin and dried, as described in Example 1. The dried thread is wound with a load of 80 kg to form an annular disc plate. The wound disc plate is entered into a metallic mold and pressed at its inner and outer peripheries under pressure of 100 kg/cm² and in its remaining portion under pressure of 80 kg/cm² at 180° C. for two minutes. The pressed disc plate is hardened in the mold, and the hardened disc plat is ground at its opposite faces to provide a friction facing with a uniform thickness of 15 mm.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A clutch disc assembly having a pair of annular friction facings in the form of a truncated-conical shape adapted to be frictionally gripped and flattened between a flywheel and a pressure plate in the engaged state, said friction facings being made of a composite material consisting essentially of asbestos fiber and thermoset resin and being arranged to be contiguous to the side-face of said flywheel at their inner peripheries and spaced apart from said flywheel at their outer peripheries in the disengaged state, and wherein the hardness of the inner periphery of said facing opposed to said flywheel is greater than that of its remaining portion, and the hardness of the outer periphery of said facing opposed to said pressure plate is greater than that of its remaining portion.

* * * * *